United States Patent
Sakomura et al.

[11] 3,911,032
[45] Oct. 7, 1975

[54] PROCESS FOR PREPARING 2-BUTENE-1,4-DIOL FROM DICHLOROBUTENES

[75] Inventors: Toshio Sakomura; Hisashi Kisaki; Shunsuke Mabuchi; Yukihiro Tsutsumi; Takashi Tada, all of Yamaguchi, Japan

[73] Assignee: Toyo Soda Manufacturing Co., Ltd., Yamaguchi, Japan

[22] Filed: Nov. 1, 1972

[21] Appl. No.: 302,910

Related U.S. Application Data

[63] Continuation of Ser. No. 834,906, June 19, 1969, abandoned.

[30] Foreign Application Priority Data

June 24, 1968  Japan............................ 43-43749
July 2, 1968    Japan............................ 43-45568

[52] U.S. Cl............. 260/636; 260/637 R; 260/640; 260/654 R; 260/654 H
[51] Int. Cl.² .................................... C07C 29/00
[58] Field of Search..... 260/636, 640, 654 R, 654 H

[56] References Cited
UNITED STATES PATENTS

| | | | |
|---|---|---|---|
| 1,221,667 | 4/1917 | Brooks et al. | 260/640 |
| 1,237,076 | 8/1917 | Matter | 260/636 |
| 1,402,317 | 1/1922 | Rodebush | 260/636 |
| 2,042,223 | 5/1936 | Groll et al. | 260/654 R |
| 2,299,477 | 10/1942 | Hearne et al. | 260/654 H |
| 2,323,781 | 7/1943 | Kohler | 260/640 |
| 2,861,084 | 11/1958 | Starcher et al. | 260/654 H |
| 2,911,450 | 11/1959 | Welton | 260/654 R |
| 3,060,237 | 10/1962 | Bain | 260/636 |
| 3,342,882 | 9/1967 | Costain et al. | 260/654 R |
| 3,349,129 | 10/1967 | Stogryn et al. | 260/636 |

*Primary Examiner*—Joseph E. Evans
*Attorney, Agent, or Firm*—Flynn & Frishauf

[57] ABSTRACT

A process for preparing 2-butene-1,4-diol from dichlorobutenes which comprises hydrolyzing dichlorobutenes in the presence of water by using a water soluble formate of a metal selected from the group consisting of group Ia and IIa of the Periodic table. As a modification of the above mentioned process, an elemental metal selected from the group consisting of copper, iron and zinc or a compound thereof is further added to said reaction system as a catalyst thereby converting substantially all of mixture of isomeric dichlorobutenes into the desired 2-butene-1,4-diol.

12 Claims, No Drawings

3,911,032

PROCESS FOR PREPARING 2-BUTENE-1,4-DIOL FROM DICHLOROBUTENES

BACKGROUND OF THE INVENTION

1. Field of the Invention

This is a continuation of application Ser. No. 834,906, filed June 19, 1969 which has been abandoned.

This invention relates to a process for preparing 2-butene-1,4-diol from dichlorobutenes using water soluble metal formate. In a modification of the process, copper, iron, zinc or a compound thereof is further added thereto. 2-butene-1,4-diol is known to be useful in the chemical industry. For example, this 2-butene-1,4-diol can be converted into butane-1,4-diol, the raw material for production of polyester fiber and for production of tetrahydrofuran, a famous solvent. Also, it is useful as a raw material for production of 2,5-dihydrofuran, a widely used solvent and for polyacetal resin production.

2. Description of Prior Art

It was known prior to this invention that an isomeric mixture of dichlorobutenes can be obtained in high yield by vapor phase chlorination of butadiene with elemental chlorine. The dichlorbutenes thus obtained are usually a mixture of 3,4-dichlorobutene and 1,4-dichlorobutene. The major of the mixture is usually 1,4-isomer (a combination of cis-isomer and trans-isomer), but the presence of 3,4-isomer cannot be neglected. And in fact, the ratio of 3,4-isomer to 1,4-isomer is about 0.5 or higher. In order to produce butenediol from such a mixture of dichlorobutenes, a hydrolyzing process using alkaline solution or water is usually adopted. The hydroxide, carbonate, bicarbonate, etc. of sodium, potassium, calcium, etc. are most often used as the alkali; however, these alkalis do not give a good yield. The primary reason for the low yield is probably due to the formation of polymer (probably polyether). When a hydroxide is employed, the formation of olefins such as monochlorobutadiene, etc. and the formation of cyclic ether and epoxide may constitute the main cause for such low yield; of course, the formation of such by-products varies depending upon the concentration of the hydroxide employed.

Further, it is natural that if hydrolyzing reaction is carried out by using such mixed dichlorobutenes as the starting material, a mixture of 3-butene-1,2-diol and 2-butene-1,4-diol is formed. And even if, pure 3,4-dichloro-1-butene and 1,4-dichloro-2-butene is used as the starting material, a mixture of 3-butene-1,2-diol and 2-butene-1,4-diol is produced. The reason for this is believed to be that since both of the dichlorobutenes can be isomerized by allyl rearrangement reaction by each other, an isomerization reaction takes place in the course of the hydrolyzing reaction. Said isomerization is probably particularly significant, when hydroxide, carbonate, or bicarbonate of sodium, potassium or calcium, or water alone is used as the hydrolyzing agent.

The present inventors were searching for a way to improve yield and quality of product without off-setting disadvantages. It was found that 2-butene-1,4-diol can be prepared in high selectivity and in high yield by using an aqueous solution of a water soluble formate, for example formate of sodium, potassium, calcium and the like.

Incidentally, by the process of this invention, 3,4-dichloro-1-butene is not subjected to hydrolysis and only 1,4-dichlor-2-butene is reacted in high selectivity and in high yield, and thereby 2-butene-1,4-diol is obtained almost quantitatively.

Further, in a modification of the process of this invention, a mixture of dichlorobutenes can be completely converted into 2-butene-1,4-diol selectively by adding an elemental metal selected from the group consisting of copper, iron and zinc or a compound thereof together with said formate to the reaction system as the catalyst. The metal can be used in any form powder, ribbon, etc. As the compound, a compound such as halide, formate, oxide, carbonate, and hydroxide can be used. Detailed conditions and processes for carrying out the present invention are given hereunder.

The composition of raw material dichlorobutenes is not limited and a mixture of dichlorobutenes having any composition can be used. However, when formate alone is used without the addition of copper, iron or zinc or a compound thereof, it is preferred to use a raw material which is rich in 1,4-isomer since this gives a higher production rate per unit volume of the reactor.

Further, when consideration is also given to the product recovery operation, the steps required for carrying out the process of this invention can be simplified, if 1,4-isomer is used as raw material. In case, copper, iron or zinc or a compound thereof is used in addition to the formate above mentioned, it is usually advantageous to use an isomeric mixture of dischlorobutenes obtained by chlorination of butadiene.

The reaction velocity increases as the reaction temperature increases. When the reaction is carried out under atmospheric pressure, it is convenient to use the boiling temperature of the reaction mixture which, of course, depends on the concentration of formate used. If a higher temperature is used under an imposed pressure, the reaction velocity increases as the temperature increases. However, a temperature higher than 150°C is not suitable because it promotes side reactions, i.e. formation of high boiling materials. On the other hand, a temperature below 70°C is not efficient because the reaction velocity is too low. Accordingly, the preferred range is within 70°C to 150°C.

It is desirable that the catalyst above mentioned be soluble in the reaction medium. However, a material which is, in general, referred to as insoluble can also be employed with good results. In general, the catalyst above mentioned is used in amount of from 0.01 to 10% by weight based on the raw material dichlorobutene, and when more than 10% by weight of catalyst is used, side reaction will increase. At the beginning of the reaction, said reaction is a heterogeneous one and therefore, strong agitation so as to provide a sufficient dispersion is desired.

The concentration of the aqueous solution of the formate can vary over a very wide range of from about 3wt% to about 80wt% without accompanying any side reaction. It is to be noted that, as mentioned before, there is a limitation on the concentration of the aqueous solution of alkali; however, there is no strict limitation on the concentration of formate solution within the approximate range of 3-80 weight percent mentioned above.

Dichlorobutene can be added to the reaction mixture in one lot or incrementally. To insure maximum reaction velocity, thorough mixing is desired so the dichlorobutene will be thoroughly dispersed in said formate solution.

As the reaction proceeds, the dichlorobutene phase disappears and only the water phase remains When a highly concentrated formate solution is employed, crystals of sodium chloride deposit in slurry form. Such deposition of sodium chloride slurry does not hinder the reaction.

The molar equivalent ratio of formate to dischlorobutene is not limited and can be selected freely. The unreacted dichlorobutene can be recovered almost completely. Therefore, an excess of dichlorobutene can be used without any loss. However, from the industrial view point, the use of excess formate is convenient. In general, it is preferred to keep the equivalent ratio of formate to dichlorobutene within a range of from 3.0:1 to 0.8:1.

When 1,4-dichloro-2-butene is reacted with excess of formate, conversion goes up to almost 100%. The reaction mixture thus obtained comprises 2-butene-1,4-diol, a small amount of ester of formic acid, a trace of 3-butene-1,2-diol, an excess of salt of formic acid, formic acid and metal chloride, the metal portion thereof corresponds to the metal portion of the salt added to the reaction system.

In summary, the characteristic features of this invention are that in a process for preparing 2-butene-1,4-diol from dichlorobutene, particularly from 1,4-dichloro-2-butene, side reactions such as isomerization and polymerization can be avoided by the use of aqueous solution of formate, and, by the use of a slight excess of formate, the conversion of dichlorobutene goes up to 100%. The latter feature makes the recovery operation of butenediol very simple and easy.

In summary, the characteristic features of one of the modification of the invention i.e. a process modified by the additon of catalyst selected from the group consisting of copper, iron, zinc and the compound thereof, are as follows:

1. Dichlorobutanes entrained in the dichlorobutene starting material are not subjected to the reaction. Said dichlorobutanes consist mainly of compounds having adjoining carbon atoms, and each one thereof having a chlorine atom.

2. Conversion of dichlorobutene can be made almost 100% by the use of a slight excess of formate.

3. All of the dichlorobutenes can be substantially completely converted into 2-butene-1,4-diol in one step.

Advantages arising from the process in industrial application are as follows:

1. Dichlorobutanes which are difficult to separate from dichlorobutene reactants by distillation can be easily separated from said reactants by carrying out the reaction.

2. Any dichlorobutenes or mixture thereof can be used as the starting material.

3. Only 2-butene-1,4-diol can be formed from a mixture of dichlorobutenes in high selectivity without using pre-isomerization.

4. Because only one step is required, the apparatus is simple.

Recovery of diol thus formed can be carried out by any process which is applicable to the recovery of water soluble material. However, it is advisable to carry out the recovery of diol after the addition of hydroxide, carbonate, bicarbonate, etc. in which the metal portion thereof corresponds to the cation of the formate used. The amount of the salt to be added is the chemical equivalent amount calculated from the amount of dichlorobutenes reacted. By the addition of said salt, the formate can be reused repeatedly. Further, if the recovery of diol is carried out after the addition of said salt as above mentioned, it makes post-treatment easy and also it increases the yield of the product. The metal chlorides contained in the formate thus recovered do not hinder the reaction of this invention.

The following examples illustrate the invention.

EXAMPLE 1

125g of 1,4-dichloro-2-butene, 150g of sodium formate, and 125g of water were put in a one liter round bottom flask equipped with an agitator and reflux cooler. The mixture was agitated for 2 hours at a temperature of about 110°C, i.e. the boiling point of the solution. Successively, 106g of sodium carbonate was added and heating and mixing were carried out for 20 minutes. The reaction mixture was then cooled to the room temperature; the crystals thus formed were washed with tetrahydrofuran and thereby the products were extracted. The extract was collected, and the tetrahydrofuran was distilled off. 85.5g of residuum was obtained. Successively, distillation was carried out under a reduced pressure of 15mmHg (abs.) and 80.7g of distillate and 4.8g of residuum were obtained. Analysis of the distillate thus obtained by gas-chromatography gave the following composition:

| | |
|---|---|
| 2-butene-1,4-diol | 98 wt% |
| 3-butene-1,2-diol | 2 wt% |

Conversion calculated from the formation of Cl⁻ was 99.3%. The yield of diol was 91.7% taking into consideration the separation-purification operation.

EXAMPLE 2

125g of 1,4-dichloro-2-butene, 150g of sodium formate, and 450g of water were put in a one liter round bottom flask equipped with an agitator and reflux cooler. The mixture was agitated for 2 hours at a temperature of about 103°C, i.e. the boiling temperature of the solution. The conversion calculated from the formation of Cl⁻ was 99.7%. Successively, 106g of sodium carbonate was added to the mixture and heating and mixing were carried out for 20 minutes. Then, water was distilled off in a rotary evaporator. The crystals thus obtained were washed with acetone; thereby the product was extracted. The extract was collected and acetone was distilled off. 86g of residum was obtained. Analysis by gas-chromatography gave the following composition:

| | |
|---|---|
| 2-butene-1,4-diol | 98 wt% |
| 3-butene-1,2-diol | 2 wt% |

The yield of 1,4-diol at this stage was 95.7% and the yield of 1,2-diol was 0.98%. Successively, distillation was carried out under a reduced pressure of 15mmHg and 81.5g of distillate was obtained. The composition of the distillate was almost the same as that of the feed for the distillation operation. Rate of recovery in this distillation step was 94.7% by weight. Over all yield of diol was 92.6% taking into consideration of said recovery operation.

EXAMPLE 3

125g of 1,4-dichloro-2-butene, 63g of 3,4-dichloro-1-butene, 150g of sodium formate and 450g of water were put in the same apparatus as in Example 1 and 2. The mixture was heated and agitated for 2 hours at 96°C. Then the reflux cooler was replaced with a simple distillation column. Dichlorobutenes, water and formic acid were distilled out at a reflux ratio of 1:1. Still bottom liquor was, after the addition of about 30g of sodium carbonate, boiled for about 20 minutes under refluxing, and then dried out in a rotary evaporator. The residuum was then extracted with acetone. From the extract, acetone was distilled off and 84g of residuum A was obtained. The distillate was neutralized with sodium bicarbonate, and then separated oily portion was collected. 62g of material B was collected.

Analysis of residuum (A) by gas-chromatography showed the following result:

| 2-butene-1,4-diol | 98 wt% |
|---|---|
| 3-butene-1,2-diol | 2 wt% |

Yield of 2-butene-1,4-diol calculated from 1,4-dichloro-2-butene corresponded to 93%.

Analysis of oil material (B) by gas-chromatography gave the following results:

| 3,4-dichloro-1-butene | 99 wt% |
|---|---|

Recovery rate calculated from 3,5-dichloro-1-butene used as the starting material corresponded to 97.5%.

Example 4.

185g of potassium formate, 70g of water were put in a one liter round bottom flask equipped with an agitator and a reflux cooler, and the contents of the flask was warmed and dissolved. Then 125g of 1,4-dichloro-2-butene was added to the flask and the reaction was carried out for 3 hours under agitation at 115°C. Then aqueous solution of potassium hydroxide having a concentration of 20% by weight was added to the reaction mixture to neutralize the the reaction mixture until the pH thereof went up to 10. After drying out the reaction mixture, the product was extracted from the crystal with tetrahydrofuran. When the extracting agent was distilled off, 89.2g of the residuum was obtained. Analysis of the residuum by gas-chromatography gave the following result:

| 2-butene-1,4-diol | 89.8 wt% |
|---|---|
| 3-butene-1,2-diol | 2.2 wt% |

The yield of 2-butene-1,4-diol corresponded to 91%.

EXAMPLE 5

Under the same conditions and using the same apparatus and the same amount of raw material as in Example 4, reaction was carried out except that 150g of calcium formate was used in lieu of potassium formate. After 3 hous reaction, the oily phase disappeared. Then, the reaction mixture was neutralized with calcium carbonate powder and further saturated with potassium chloride. The reaction mixture was subjected to liquid-liquid extraction by using tetrahydrofuran. The extract contained 69.5g of 2-butene-1,4-diol and 0.55g of 3-butene-1,2-diol. The yield of said 1,4-diol was 79% and said 1,2-diol was 1.8%.

EXAMPLE 6

The same apparatus as used in Example 1 was used. 408g of sodium formate and 324g of water were put in the apparatus and the contents of the flask was warmed and dissolved. Then 125g of 1,4-dichloro-2-butene was added to the flask and the reaction was carried out for 2 hours under agitation at 110°C. Then, in order to neutralize the reaction mixture, aqueous solution of sodium hydroxide having a concentration of 47% by weight was added to the reaction mixture until the pH there of went up to 9. After drying out the reaction mixture, the product was extracted from the crystal with tetrahydrofuran. When the extracting agent was distilled off, 96.4g of residuum was obtained. Analysis of the residuum by gas-chromatography gave the following result:

| 2-butene-1,4-diol | 85.6 wt% |
|---|---|
| 3-butene-1,2-diol | 2.7 wt% |

The yield of 2-butene-1,4-diol corresponded to 93.7%.

EXAMPLE 7

125g of mixed dichlorobutenes (42g of 3,4-dichloro-1-butene, 83g of cis- and trans-1,4-dichloro-2-butene), 150g of sodium formate, 450g of water and 5g of basic copper carbonate were put in a one liter round bottom glass flask equipped with an agitator and a reflux cooler. The mixture was agitated for 2 hours at a temperature of about 100°C. Then 106g of sodium carbonate was added thereto and agitation was carried out for an additional 20 minutes. The content was dried out in a rotary evaporator, and about 401ml of water was obtained. At the distillate receiver bottom, 0.5g of oily material was found. Analysis of the oily material by gas-chromatography showed 3,4- and 1,4-dichlorobutene.

The crystals thus obtained were washed and extracted with tetrahydrofuran,, and then tetrahydrofuran was distilled off from the extract; thereby 85g of residuum was obtained. The result of analysis was follows:

| 2-butene-1,4-diol | 94 wt% |
|---|---|
| 3-butene-1,2-diol | 1 wt% |
| others | 5 wt% |

The yield of 2-butene-1,4-diol calculated from mixed dichlorobutenes was 91%. Comparative Example 1.

125g of 3,4-dichloro-1-butene, 150g of sodium formate and 450g of water were added to the same apparatus as in EXample 7. The mixture was agitated for 6 hours at a temperature of about 95°–97°C. The dichlorobutene phase, existing as an oily state floated on the upper portion of the reaction mixture. The conversion of dichlorobutene calculated from the amount of Cl⁻ formation was only 6%.

EXAMPLE 8

After the reaction of Comparative Example 1, 5g of copper formate was added to the reaction mixture and agitation was carried out for 2.5 hours at a temperature of 97°–103°C. Then 106g of sodium carbonate was added thereto and agitation was carried out for an additional 20 minutes at the same temperature. The content was distilled off. In the distilled water, there was absolutely no oily material. The crystals thus obtained were extracted several times with tetrahydrofuran and the extracting agent was distilled off. Thus, 84g of residuum was obtained. The result of the analysis was as follows:

| | |
|---|---|
| 2-butene-1,4-diol | 95 wt% |
| 3-butene-1,2-diol | 2 wt% |
| others | 3 wt% |

The yield of 2-butene-1,4-diol was 90%.

EXAMPLE 9

125g of mixed dichlorobutenes (3,4-isomer 42g, 1,4-isomer 83g), 200g of sodium formate, 500g of water and 5g of cupric chloride were put in a 2 liter round bottom flask equipped with a reflux cooler and a mixer. The mixture was mixed for 2 hours at a temperature of about 100°C. Then 106g of sodium carbonate was added and agitation was carried out for an additional 15 minutes.

Successively, 125g of mixed dichlorobutenes (the composition of which was identical to that mentioned above) was added to the mixture and agitated for 2 hours and 106g of sodium carbonate was further added thereto and mixing was carried out for 15 minutes. This procedure was repeated once again. The contents of the flask was dried out in a rotary evaporator and the residuum was extracted with tetrahydrofuran. After the extracting agent was distilled off, 252g of residuum was obtained. The composition of the residuum was 2-butene-1,4-diol 92%, 3-butene-1,2-diol 2% and the other components 6% (% is expressed in term of % by weight, respectively). The yield of 2-butene-1,4-diol calculated from the mixed dichlorobutenes used was 88%. After drying out, the weight of the crystals was 551g. The composition thereof was as follows:

| | |
|---|---|
| sodium chloride | 350g |
| sodium formate | 197g |
| copper (calculated as cupric chloride) | 3.8g |

The conversion of mixed dichlorobutenes corresponded to 99.7%.

COMPARATIVE EXAMPLE 2

Using the same apparatus as in Example 7, the same amounts of materials was put in the apparatus as in Example 7 and then 10g of 1,2-dichlorobutane and 20g of 2,3-dichlorobutane were added thereto. Agitation of the reaction mixture was carried out for the same length of time at the same temperature as in Example 7. Then, the reaction was carried out for the same length of time using the same amount of sodium carbonate as in Example 7 and then 100g of water was added to the reaction mixture. After the addition of water, the reaction mixture was dried out in a rotary evaporator. The distilled water fraction obtained by the evaporation step contained 29g of oily material at the bottom thereof. The composition analysis of the oily portion by gas-chromatography gave the following result:

| | |
|---|---|
| 1,2-dichlorobutane | 34 wt% |
| 2,3-dichlorobutane | 65 wt% |
| total of 3,4-dichloro-1-butene and 1,4-dichloro-2-butene | 1 wt% |

That is, the compounds having adjoining carbon atoms and each one thereof having a chlorine atom were not subjected to hydrolysis. Example 10.

Under the same conditions and using mixed dichlorobutenes having same composition and using the same apparatus as used in Example 7, reaction was carried out except that 2g of ferric chloride was added instead of basic copper carbonate. After the reaction had been completed, post-treatments were carried out similarly. After tetrahydrofuran extractant was distilled off, 89g of residuum was obtained.

| | results of analysis |
|---|---|
| 2-butene-1,4-diol | 81 wt% |
| 3-butene-1,2-diol | 9 wt% |
| others | 10 wt% |

The yield of 2-butene-1,4-diol was 82%.

EXAMPLE 11

Under the same conditions and using mixed dichlorobutenes having same composition and using the same apparatus as used in Example 7, reaction was carried out except that 3g of copper powder was added instead of basic copper carbonate. After the reaction had been completed, post-treatments were carried out similarly. After tetrahydrofuran extractant was distilled off, 89g of residuum was obtained.

| | result of analysis |
|---|---|
| 2-butene-1,4-diol | 78 wt% |
| 3-butene-1,2-diol | 8 wt% |
| others | 14 wt% |

The yield of 2-butene-1,4-diol was 79%.

EXAMPLE 12

Under the same conditions and using the same apparatus and raw materials as in Example 7, reaction was carried out except that 5g of zinc oxide was added instead of basic copper carbonate. After the reaction had been completed, post-treatments were carried out similarly. After tetrahydrofuran extractant was distilled off, 81g of residuum was obtained.

| | result of analysis |
|---|---|
| 2-butene-1,4-diol | 71 wt% |
| 3-butene-1,2-diol | 12 wt% |
| others | 17 wt% |

The yield of 2-butene-1,4-diol was 65%.

EXAMPLE 13

Under the same conditions and using the same apparatus and raw materials as in Example 7, reaction was carried out except that 5g of ferric hydroxide was added instead of basic copper carbonate. After the reaction had been completed, post-treatments were carried out similarly. After tetrahydrofuran extractant was distilled off, 89g of residuum was obtained.

| result of analysis | |
|---|---|
| 2-butene-1,4-diol | 79 wt% |
| 3-butene-1,2-diol | 10 wt% |
| others | 11 wt% |

The yield of 2-butene-1,4-diol was 80%.

EXAMPLE 14

Under the same conditions and using the same apparatus and raw materials as in Example 7, reaction was carried out except that 5g of cupric oxide was added instead of basic copper carbonate. After the reaction had been completed, post-treatments were carried out similarly. After tetrahydrofuran extractant was distilled off, 83g of residuum was obtained.

| result of analysis | |
|---|---|
| 2-butene-1,4-diol | 70 wt% |
| 3-butene-1,2-diol | 16 wt% |
| others | 14 wt% |

The yield of 2-butene-1,4-diol was 66%.

EXAMPLE 15

Under the same conditions and using the same apparatus and raw materials as in Example 7, reaction was carried out except that 5g of cupric hydroxide was added instead of basic copper carbonate. After the reaction had been completed, post-treatments were carried out similarly. After tetrahydrofuran extractant was distilled off, 85g of residuum was obtained.

| result of analysis | |
|---|---|
| 2-butene-1,4-diol | 74 wt% |
| 3-butene-1,2-diol | 12 wt% |
| others | 14 wt% |

The yield of 2-butene-1,4-diol was 71%.

EXAMPLE 16

Under the same conditions and using the same apparatus and raw materials as in Example 7, reaction was carried out except that 5g of iron powder was added instead of basic copper carbonate. After the reaction had been completed, post-treatments were carried out similarly. After the tetrahydrofuran extractant was distilled off, 86g of residuum was obtained.

| result of analysis | |
|---|---|
| 2-butene-1,4-diol | 80 wt% |
| 3-butene-1,2-diol | 9 wt% |
| others | 11 wt% |

The yiled of 2-butene-1,4-diol was 78%.

EXAMPLE 17

Under the same conditions and using the same apparatus and raw materials as in Example 7, reaction was carried out except that 5g of zinc powder was added instead of basic copper carbonate. After the reaction had been completed, post-treatments were carried out similarly. After tetrahydrofuran extractant was distilled off, 82g of residuum was obtained.

| result of analysis | |
|---|---|
| 2-butene-1,4-diol | 72 wt% |
| 3-butene-1,2-diol | 12 wt% |
| others | 16 wt% |

The yield of 2-butene-1,4-diol was 67%.

EXAMPLE 18

Same apparatus as used in Example 7 was used. 408g of sodium formate, 324g of water and 1g of copper formate were put in the apparatus and the contents of the flask was warmed and dissolved. Then, 125g of mixed dichlorobutenes having the same composition as used in Example 7 was added to the flask and the reaction was carried out for 2 hours under agitation at 110°C. Then, in order to neutralize the reaction mixture, aqueous solution of sodium hydroxide having a concentration of 47% by weight was added to the reaction mixture, until the pH thereof went to 9. After drying out the reaction mixture, the product was extracted from the crystal with tetrahydrofuran. When the extracting agent was distilled off, 96.0g of residuum was obtained. Analysis of the residuum by gas-chromatography gave the following result:

| | |
|---|---|
| 2-butene-1,4-diol | 84.8 wt% |
| 3-butene-1,2-diol | 4.3 wt% |

The yield of 2-butene-1,4-diol corresponded to 92.5%.

What is claimed is:

1. A process for preparing 2-butene-1,4-diol from 1,4-dichloro-2-butene or a mixture of dichlorobutenes rich in 1,4-dichloro-2-butene by a hydrolysis reaction comprising hydrolyzing 1,4-dichloro-2-butene in a reaction charge of (1) said 1,4-dichloro-2-butene, (2) water and (3) a water soluble formate of a metal selected from the group consisting of metals of I*a* and group II*a* of the periodic table at a temperature of from 70°C. to 150°C., the concentration of the aqueous solution of said formate being from about 3 to about 80 percent by weight and the equivalent ratio of said formate to said dichlorobutene being within a range from about 3:1 to about 0.8:1.

2. A process of claim 1, wherein the starting material employed is 1,4-dichloro-2-butene.

3. A process of claim 1, wherein said mixture of dichlorobutenes is obtained from vapor phase chlorination of butadiene.

4. A process of claim 1, wherein said formate is selected from the group consisting of sodium formate, potassium formate and calcium formate.

5. A process of claim 1, wherein a hydroxide, carbonate or bicarbonate of the metal corresponding to the cation of said formate is added to the resulting reaction mixture, the amount of said hydroxide, carbonate or bicarbonate being chemically eqivalent to the amount of said dichlorobutene.

6. A process for preparing 2-butene-1,4-diol from a mixture of dichlorobutenes by a hydrolysis reaction comprising hydrolyzing a reaction charge of (1) a mixture of dichlorobutenes, (2) water, (3) a water soluble formate of a metal selected from the group consisting of metals of group Ia and group IIa of the periodic table, and (4) a member selected from the group consisting of copper, iron, zinc, and a halide, oxide, hydroxide, carbonate or lower aliphatic acid salt thereof as a catalyst, at a temperature of from 70°C. to 150°C., the concentration of the aqueous solution of said formate being in a range of from about 3 to about 80 percent by weight and the molar ratio of said formate to said dichlorobutene being within a range of from about 3:1 to about 0.8:1, whereby substantially all of said dichlorobutenes are converted into 2-butene-1,4-diol.

7. A process of claim 6, wherein the amount of catalyst employed is within a range of 0.01 – 10% by weight based on dichlorobutenes employed.

8. A process of claim 6, wherein said formate is selected from the group consisting of sodium formate, potassium formate and calcium formate.

9. A process of claim 6, wherein said catalyst is selected from the group consisting of halide, oxide, hydroxide, carbonate and lower aliphatic acid salt of copper, iron and zinc.

10. A process of claim 6, wherein said catalyst is selected from the group consisting of copper formate and copper chloride.

11. A process of claim 6, wherein said mixture of dichlorobutenes is obtained from vapor phase chlorination of butadiene.

12. A process of claim 6, wherein a hydroxide, carbonate or bicarbonate of the metal corresponding to the cation of said formate is added to the resulting reaction mixture, the amount of said hydroxide, carbonate or bicarbonate being chemically equivalent to the amount of said dichlorobutene.

* * * * *